Figure 1:
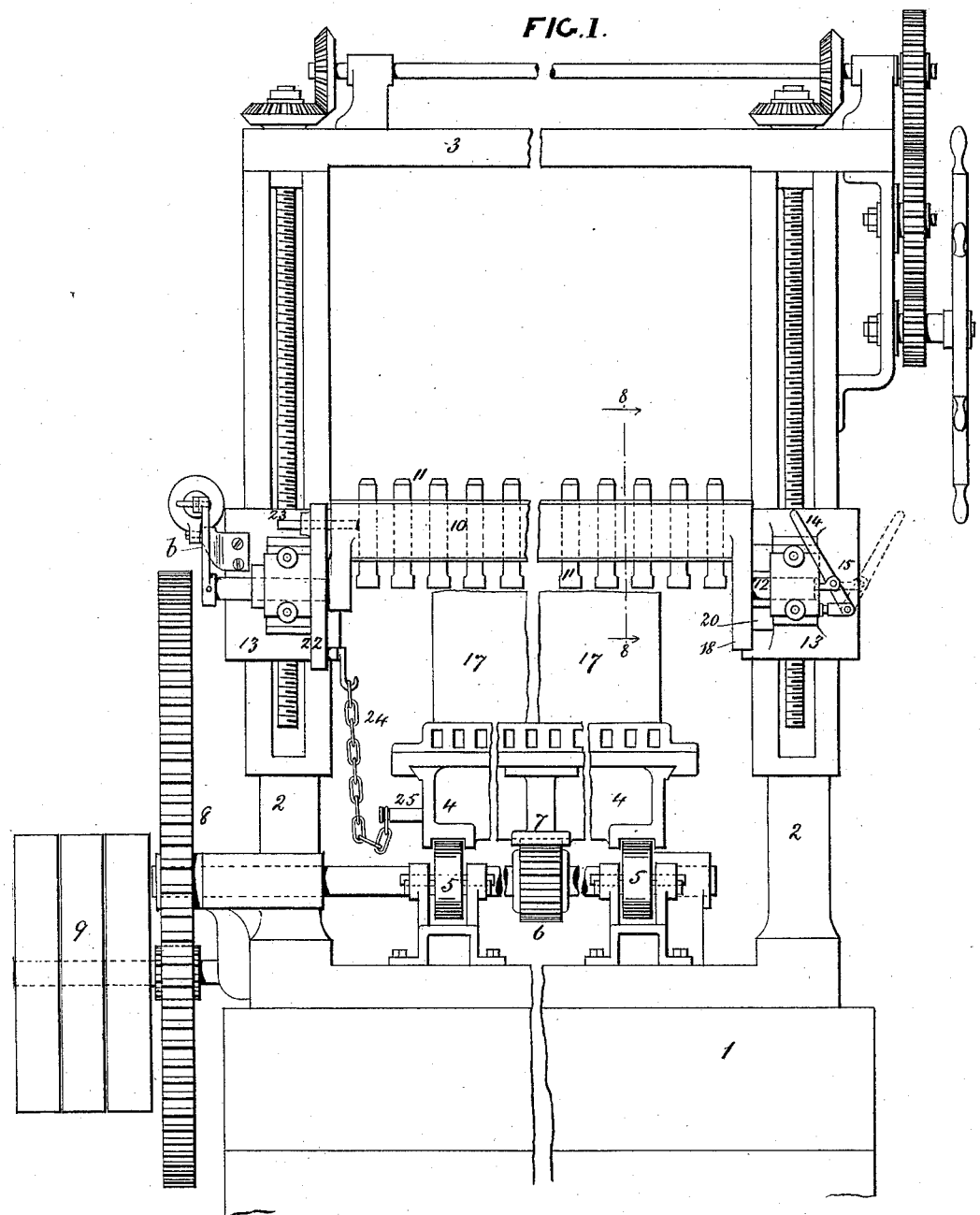

(No Model.) 4 Sheets—Sheet 1.

J. COULTER.
MACHINERY FOR DRESSING AND PLANING STONE.

No. 387,341. Patented Aug. 7, 1888.

WITNESSES
John A. Rennie
Paschal J. Ferrara

INVENTOR
James Coulter,
By his Attorneys,
Arthur E. Fraser & Co.

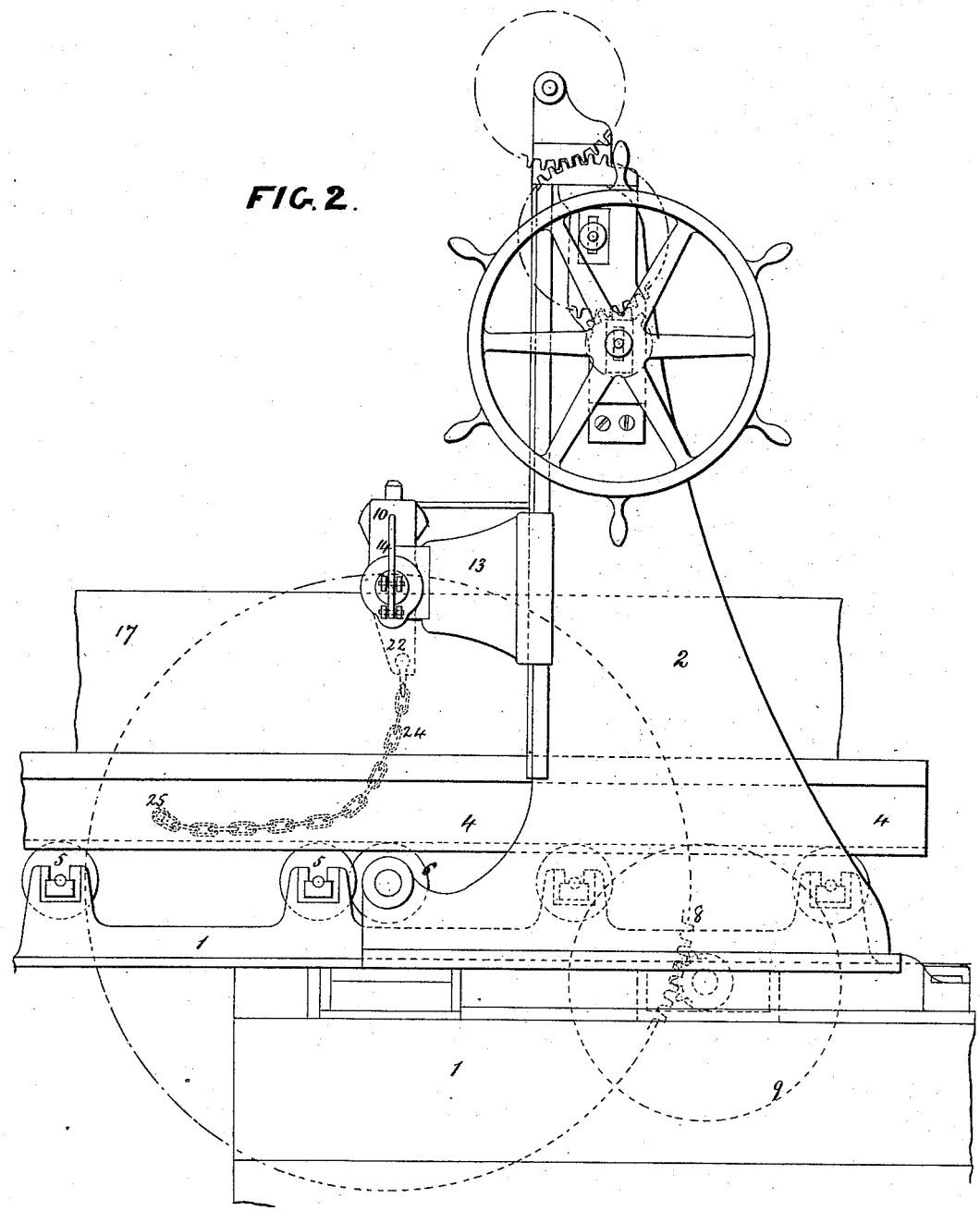

(No Model.) 4 Sheets—Sheet 3.
J. COULTER.
MACHINERY FOR DRESSING AND PLANING STONE.
No. 387,341. Patented Aug. 7, 1888.
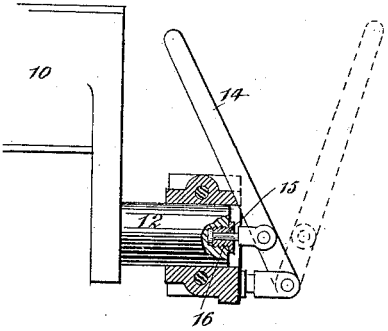
FIG: 3.
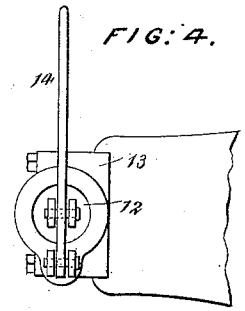
FIG: 4.
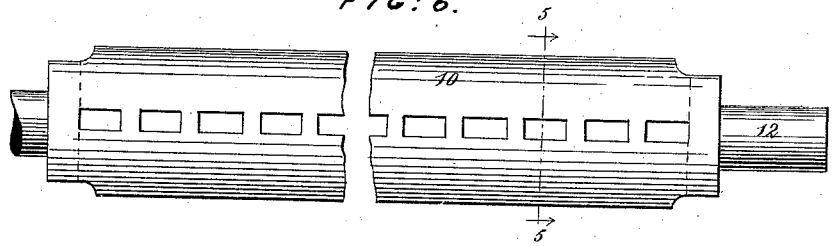
FIG: 6.
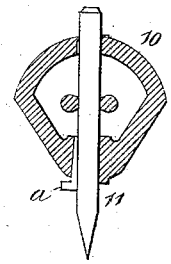
FIG: 5.
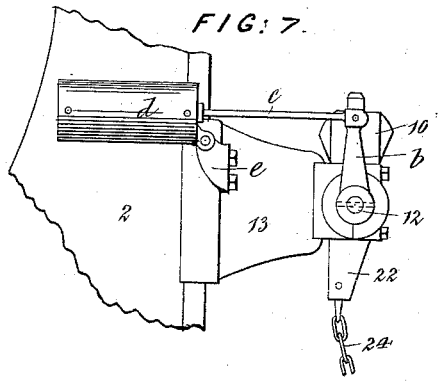
FIG: 7.
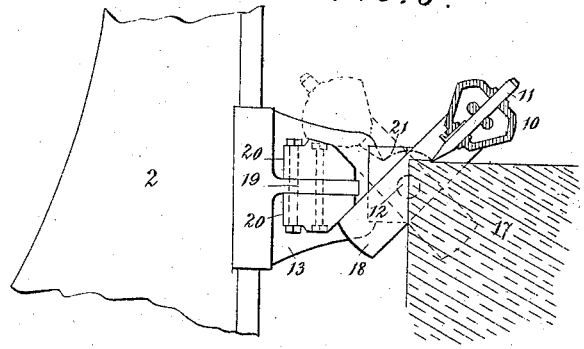
FIG: 8.
WITNESSES:
John H. Rennie
Paschal J. Ferrara
INVENTOR:
James Coulter,
By his Attorneys,
Arthur C. Fraser & Co.

(No Model.) 4 Sheets—Sheet 4.
J. COULTER.
MACHINERY FOR DRESSING AND PLANING STONE.
No. 387,341. Patented Aug. 7, 1888.
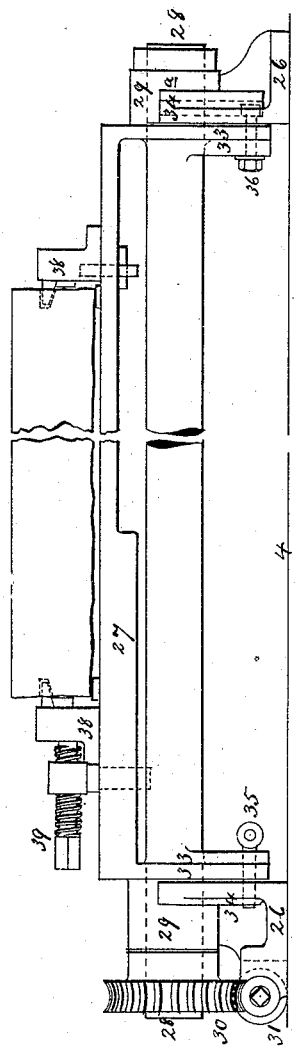
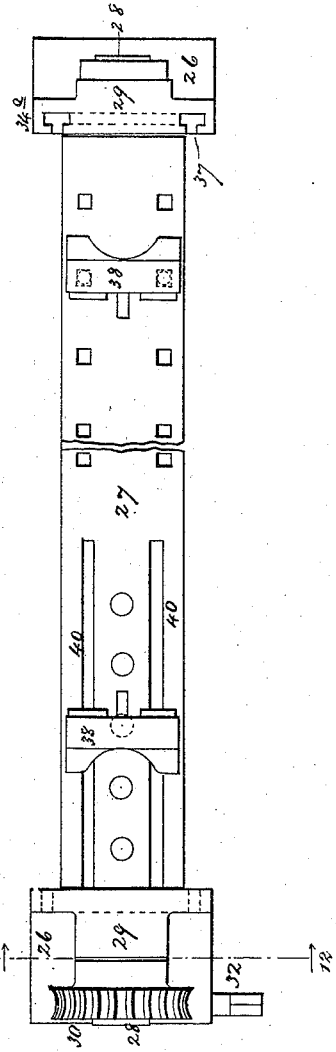
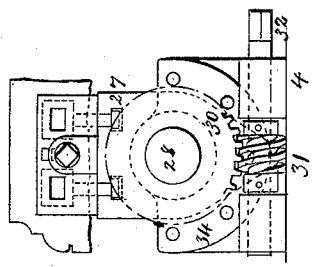
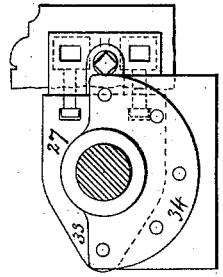
WITNESSES
John H. Rennie.
Paschal J. Ferard
INVENTOR
James Coulter.
By his Attorneys,
Arthur C. Fraser & Co.

UNITED STATES PATENT OFFICE.

JAMES COULTER, OF BATLEY, COUNTY OF YORK, ENGLAND.

MACHINERY FOR DRESSING AND PLANING STONE.

SPECIFICATION forming part of Letters Patent No. 387,341, dated August 7, 1888.

Application filed May 5, 1887. Serial No. 237,188. (No model.) Patented in England July 2, 1885, No. 8,026.

*To all whom it may concern:*

Be it known that I, JAMES COULTER, a subject of the Queen of Great Britain, residing in Batley, county of York, England, have invented certain new and useful Improvements in Machinery for Dressing or Planing Stone, Marble, and other like Minerals, of which the following is a specification.

This invention has been patented to me in Great Britain by Letters Patent No. 8,026, July 2, 1885; and it consists in improvements upon the machines shown in British Letters Patent No. 959, dated April 1, 1872, and No. 548, dated February 8, 1877, granted to myself and Herbert Harpin.

My invention has for its object the construction and combination of mechanism for dressing or planing stone, marble, granite, or other minerals.

In carrying out my invention I employ suitable stationary frame-work, with a traveling bed for carrying the material backward and forward under suitably-arranged cutting-tools, which tools are mounted in a cross-head provided with a number of holes or slots in which to place the cutting-tools, and which are made secure by keys or wedges. The cross-head is supported at each end by suitable brackets, in which it is capable of sliding endwise by means of a lever and rod, so that the cross-head and tools can be moved laterally to permit the said tools to operate upon another part of the stone. Apparatus is also employed for oscillating the cross-head and tools each time the table carrying the stone gets to the end of its stroke, so that the other side of the cutting-tools are presented to the stone, in which case the stone is operated upon during the backward-and-forward motion of the traveling table. For the purpose of carrying out this part of my invention I connect a chain to one or both sides of the table, the other end of such chain being connected to an arm projecting from the cross-head, so that just before the traveling table arrives at the end of its stroke the chain would be tightened and overturn the cross-head, thereby presenting the other side of the cutting-edge of the tools toward the stone for the return-stroke.

The stone to be operated upon is carried upon a rocking or movable table, so that the stone, after being dressed on one side, may be turned partly around and adjusted at any required angle, so as to expose another side of the stone to the action of the cutting-tools. The rocking table is mounted on centers supported in brackets or pedestals fixed to the ordinary bed of the machine. On the end of one of the centers or axis is a worm-wheel, which gears with a worm provided with a hand wheel or lever. Each axis also carries a disk or plate, one of which may have a series of holes for the reception of a pin, which may be passed through the plate into a corresponding hole in the bracket or pedestal, by which the table may be retained in its position. The other disk may have only one hole, through which passes the end of a bolt, the head of which slides in a circular slot formed in the pedestal, so that when the table has been adjusted the nut of the bolt may be screwed up and thereby retain the table firmly in the desired position.

In order that my invention may be better understood, reference is made to the annexed drawings, wherein—

Figure 1 is an end elevation of a stone-dressing machine having my improvements applied thereto, some parts of which are similar to machines used for planing iron. Fig. 2 is a side elevation thereof. Fig. 3 is a fragmentary section on a larger scale. Fig. 4 is a side elevation of Fig. 3. Fig. 5 is a cross-section, and Fig. 6 a plan, of one of the cross-slides or tool-holders on a large scale. Fig. 7 is a fragmentary side elevation of my machine, looking at the opposite side from that seen in Fig. 2, and showing the air-cushioning device. Fig. 8 is a vertical section on the line 8 8 in Fig. 1. Fig. 9 is an end view of my rocking bed. Fig. 10 is a side elevation thereof. Fig. 11 is a plan thereof, and Fig. 12 is a section thereof cut on the line 12 12 in Fig. 11.

Let 1 represent the stationary frame-work of the machine, carrying a standard, 2, at each side thereof and connected together at the top by cross-rail 3.

4 is the traveling bed resting and sliding upon small rollers 5, such table being caused to travel backward and forward by pinion-wheel 6, working in a rack, 7, fixed underneath the table 4, such said pinion being driven by gear-wheels 8 and pulleys 9, all of which are so far arranged after the manner of an iron-planing machine.

10 is the cross-head or tool-holder, corresponding in length to the width of the machine, such tool-holder being made with a number of holes or slots to receive the cutting-tools 11, which are fastened therein by wedges a, or other suitable means. The cross-head is made with short shafts or journals 12, which rest in and are supported by brackets 13 at each side of the machine, in which brackets the shafts or studs of the cross-head are made to slide endwise by means of a lever, 14, and stud 15, which is fastened in the end of one of the shafts 12 by means of a screwed boss or gland, 16. (See Figs. 3 and 4.) Therefore when the stone 17 has passed under the cutting-tools 11 and been dressed thereby, and it is necessary to move the position of the tools so as to operate upon the undressed parts of the stone, the lever 14 is drawn forward, as shown in dotted lines, whereby the cross head and tools therein are moved laterally, say, the width of the tools, so that on the next movement of the stone under the tools the remaining parts of the stone will be dressed. The cutting-tools 11 are held in the cross-head 10 by wedges a. (See Figs. 5 and 8.)

In order to oscillate the tool-holder at the end of the table's traverse, so that the tools can operate upon the stone at the backward-and-forward motion, I fix the tool-holder 10 to the lever 22 (see Fig. 1) by means of a pin, 23. The bottom end of this lever 22 carries a chain, 24, one end of which is attached to a stud, 25, projecting from the side of the traveling bed 4, the arrangement being such that just before the traveling table arrives at the end of its stroke in either direction the chain would be tightened, so as to oscillate the cross-head 10 upon its centers 12, thereby presenting the other side of the cutting-edge of the tools toward the stone for acting upon it on the return-motion of the table, and this occurs each time the traveling table arrives at the end of its stroke. In order to alter the length of cut given to the stone by the tools, one or more links in the chain may be taken up or let out, as required.

To cushion the fall of the cross-head 10 when it is oscillated by the chain 24, I provide an air-cushioning device. (Best seen in Fig. 7.) On the end of the stud 12 is keyed an arm, b, which has a pin in its free end taking into the end of a piston-rod, c. The piston-rod c enters an air-cylinder, d, which is hinged to a bracket, e, fastened to the bracket 13. A piston on the end of rod c works in the cylinder d and cushions the oscillations of the cross-head. Fig. 8 illustrates my method of holding the cross-head 10 in its two cutting positions, and also the means by which I finish the end of the stone without chipping the same below the line of the cut.

On one end of the cross-head 10, I form an arm, 18, projecting below the stud 12, and on the bracket 13, I form a stop consisting of a flange or lug, 19, on both sides of which I bolt beveled blocks of wood 20. This stop is so arranged that when the cross-head is thrown to cut in one direction the arm 18 rests against the stop and holds the cross-head in that position until it is reversed by the chain 24, when the cross-head is thrown to the other side of the stud and rests directly on the stop, as shown in dotted lines in Fig. 8, and is held in this position by the stop while it makes its return-cut.

I find that the tools are liable to chip off the end of the stone if they are allowed to cut up to the edge thereof. To avoid this and give a square finish up to the edge of the stone, I pivot the cross-head 10 below the cutting-edges of the tools, as seen in Fig. 8, and arrange the chain 24, so that it will throw the cross-head over just before the tools reach the end of the stone. Fig. 8 shows the machine in the position just before the tools are thrown over. As the stone moves back for the return-cut, the tools take off the uncut edge left by the former cut without chipping the stone below the line of their points. The dotted arc 21, Fig. 8, is the path traveled by the points of the tools as they are thrown over by the chain 24.

When operating upon a class of stone which requires dressing upon more than one side for ornamental purposes, I attach the stone to a rocking bed, so that the stone after being operated upon on one side may be turned partially around and adjusted at any required angle, so as to expose another side of the stone to the action of the cutting-tools without removing it from its fixing upon the table. This part of my invention is shown in Figs. 9, 10, 11, and 12.

Let 4 represent the top of the traveling bed, carrying brackets 26 on each side thereof.

27 is the rocking bed, mounted on centers or studs 28, supported in bosses 29, projecting from brackets 26. On end of studs 28, I fix a worm-wheel, 30, in gear with a worm, 31, on short cross-shaft 32, which may be operated by hand-wheel or other means. The stud 28 and rocking table 27 carry plates or projections 33, having a hole in their lower ends, and the boss 29 is also made with a plate or segment, 34, with a series of holes formed therein, so that if the pin 35 is inserted through the holes in the two plates 33 and 34 the rocking table 27 is kept in position. The plate $34^a$ has only one hole, through which passes the head of the bolt 36, and such head slides or traverses within the circular slot 37, made in the stationary plate $34^a$. The bolt 36 may be used along with the pin 35 for retaining the rocking table in position, or it may be used separately when it is desired to set the table 27 at an angle for which no hole has been provided.

Fig. 12 shows the table 27 with the stone thereon in another position and exposing another side of the stone to the action of the cutting-tools. The stone is fixed to the table and held firmly thereon by means of movable jaws 38, which work in slots in the oscillating table 27, and are opened and closed by means of the screws 39. Slots 40 are made in the said bed, so as to allow the jaws to take in different sizes of stones. By this arrangement three sides of a block of stone or marble may be dressed or cut without removing the stone from its fixing upon the table and the cutting may be effected at any variety of angle.

It will readily be understood that the knives 11 may be placed vertically instead of horizontally, and that various changes in the mechanism may be made without departing from my invention. It will also be seen that the cross-head 10 may be made without an endwise movement, and that the stone may be moved laterally under the tools for finishing.

I claim as my invention—

1. In a stone-dressing machine, a reciprocating bed which carries the stone to be dressed, in combination with a laterally-adjustable tool-holder mounted above said reciprocating bed, which holder holds the cutting-tools in a stationary position while the same are operating upon the stone, and said holder having sliding journals which slide in their bearings, and means for moving said holder laterally when the cutting-tools are not operating upon the stone, substantially as set forth.

2. In a stone-dressing machine, a reciprocating bed which carries the stone to be dressed, in combination with an oscillating and laterally-adjustable tool-holder mounted crosswise of said reciprocating bed, the bearings for said tool-holder, said tool-holder having sliding journals which slide in said bearings, and an operating-lever pivotally connected to one of said journals and to said bearing, substantially as set forth.

3. In a stone-dressing machine, a reciprocating bed which carries the stone to be dressed, in combination with an oscillating tool-holder mounted crosswise of said reciprocating bed, the axis on which said holder oscillates being in a plane nearer to the surface of the bed than the cutting-edges of the tools carried by the holder, substantially as set forth, whereby when the holder is oscillated the cutting-edges of the tools will be lifted from the surface of the stone.

4. In a stone-dressing machine, a reciprocating bed which carries the stone to be dressed and an oscillating tool-holder journaled crosswise of the bed, in combination with a chain attached at opposite ends to said bed and said holder, substantially as set forth.

5. In a stone-dressing machine, a reciprocating bed which carries the stone to be dressed and an oscillating tool-holder journaled crosswise of said bed, in combination with a lever, 22, carried by said tool-holder and extending in the direction of the bed, and a chain attached at opposite ends to said lever and to said bed, substantially as set forth.

6. In a stone-dressing machine, a reciprocating bed which carries the stone to be dressed and an oscillating tool-holder journaled crosswise of said bed, said holder carrying a single set of tools which dress the stone during both movements of the bed, in combination with a fixed stop, 20, having oppositely-inclined faces, and an arm, 18, on the tool-holder, which encounters said stop on one face, the holder itself encountering the other face of the stop, substantially as set forth, whereby the tools are presented to the stone at the proper angle during both movements of the bed.

In witness whereof I have hereunto signed my name in the presence of two subscribing witnesses.

JAMES COULTER.

Witnesses:
ARTHUR C. FRASER,
GEORGE H. FRASER.